United States Patent [19]

Lin

[11] Patent Number: 5,710,972
[45] Date of Patent: Jan. 20, 1998

[54] METHOD AND APPARATUS FOR DEFERRING ZONE RESISTRATIONS FROM A PSU-PAGER WHEN THE PSU'S OWN CALL RATE IS LESS THAN OR EQUAL TO A TRANSMITTED THRESHOLD

[75] Inventor: Jyh-Han Lin, Keller, Tex.

[73] Assignee: Motorla, Inc., Schaumburg, Ill.

[21] Appl. No.: 559,583

[22] Filed: Nov. 16, 1995

[51] Int. Cl.$^6$ .............................. H04Q 7/00; H04M 15/00
[52] U.S. Cl. ............................................. 455/33.1; 379/113
[58] Field of Search ...................... 379/111, 112, 379/114, 121, 130, 131, 133, 139, 140, 190, 194, 50, 59–63, 134, 113; 340/825.44, 38.11; 455/33.1, 33.2, 56.1, 54.2

[56] References Cited

U.S. PATENT DOCUMENTS

| | | | |
|---|---|---|---|
| 4,644,347 | 2/1987 | Lucas et al. | |
| 4,875,038 | 10/1989 | Siwiak et al. | 340/825.44 |
| 4,972,355 | 11/1990 | Mullins | 379/59 |
| 5,065,423 | 11/1991 | Gaskill | |
| 5,097,499 | 3/1992 | Cosentino | 379/59 |
| 5,276,911 | 1/1994 | Levine et al. | 455/53.1 |
| 5,448,633 | 9/1995 | Jamaleddin et al. | 379/201 |
| 5,574,973 | 11/1996 | Borth et al. | 455/33.1 |
| 5,629,975 | 5/1997 | Tiedemann, Jr. et al. | 379/60 |
| 5,631,947 | 5/1997 | Wittstein et al. | 379/59 |

*Primary Examiner*—Tommy P. Chin
*Assistant Examiner*—David R. Vincent
*Attorney, Agent, or Firm*—Pable Meles

[57] ABSTRACT

A method and apparatus controls zone registrations in a radio communication system providing radio coverage to a portable subscriber unit (122) within a plurality of zones (402), wherein the portable subscriber unit (PSU) determines its own call rate (602). A fixed portion (102) of the radio communication system sends the PSU a threshold value based on communication activity associated with the PSU, a call rate estimation interval value, and a multiplier for normalizing the PSU's own call rate with the threshold value. The fixed portion accepts zone registrations from the PSU when the PSU's own call rate is greater than the threshold value and defers zone registration from the PSU when the PSU's own call rate is less than or equal to the threshold value until the PSU's own call rate exceeds the threshold value.

28 Claims, 8 Drawing Sheets

400

5,710,972

METHOD AND APPARATUS FOR DEFERRING ZONE RESISTRATIONS FROM A PSU-PAGER WHEN THE PSU'S OWN CALL RATE IS LESS THAN OR EQUAL TO A TRANSMITTED THRESHOLD

FIELD OF THE INVENTION

This invention relates in general to radio communication systems and more specifically to a zoned radio communication system providing control of registrations.

BACKGROUND OF THE INVENTION

In a two-way communication system, and particularly in a two-way messaging system, the coverage area is often divided into regions or zones. Such a zoned communication system advantageously allows frequency reuse for improved radio frequency spectrum efficiency. A communication system, divided in such a manner must either know beforehand the location of a subscriber to deliver a message thereto, or the system must search the entire coverage area for the subscriber before the message can be delivered. The search process can delay the delivery of the message. During periods of high traffic the delays can become unacceptable to some users. To facilitate the locating of subscribers, conventional systems have been designed such that subscriber units monitor the communication channel to detect movement from one zone to another zone and to automatically register with the new zone when a zone boundary crossing is detected. During periods of high traffic and high subscriber mobility the traffic generated by the registration requests can load a system to the point where long delays in message delivery are experienced. The small number of base receivers on the inbound path from a subscriber unit creates a bottleneck for the system. Further bottleneck problems can be encountered when subscriber units are either powering off and attempting to de-register or attempting to notify the system that the subscriber is going from a two-way type device to a one-way type device.

Thus, what is needed is a method and apparatus for controlling zone registrations taking into account actual use requirements as viewed from the perspective of both the subscriber unit and the infrastructure or fixed portion of the communication system.

SUMMARY OF THE INVENTION

An aspect of the present invention is a method of controlling zone registrations in a radio communication system providing radio coverage to a portable subscriber unit within a plurality of zones where the portable subscriber unit determines its own call rate. The method comprises in a fixed portion of the radio communication system the steps of sending to the portable subscriber a threshold value based on communication activity associated with the portable subscriber unit and accepting registration from the portable subscriber unit when the portable subscriber unit's own call rate is greater than the threshold value.

Another aspect of the present invention is a method of controlling zone registrations in a radio communication system providing radio coverage to a portable subscriber unit within a plurality of zones where the portable subscriber unit determines its own call rate. The method comprises in the portable subscriber unit the steps of receiving from a fixed portion of the radio communication system a threshold value based on communication activity associated with the portable subscriber unit and registering with the fixed portion when the portable subscriber unit's own call rate is greater than the threshold value and deferring zone registration with the fixed portion when the portable subscriber unit's own call rate is less than or equal to the threshold value until the portable subscriber unit's own call rate exceeds the threshold value.

A third aspect of the present invention is a controller for controlling zone registrations in a radio communication system providing radio coverage to a portable subscriber unit within a plurality of zones. The controller comprises a processing system for controlling operation of the controller and a transmitter interface coupled to the processing system for sending information including a message to the portable subscriber unit. The controller further comprises a receiver interface coupled to the processing system for receiving information including a zone registration request from the portable subscriber unit. The processing system is programmed for sending to the portable subscriber unit a threshold value based on communication activity associated with the portable subscriber unit and for accepting zone registrations from the portable subscriber unit when the portable subscriber unit's own call rate is greater than the threshold value.

A fourth aspect of the present invention is a portable subscriber unit for controlling zone registrations in a radio communication system providing radio coverage to the portable subscriber unit within a plurality of zones wherein the portable subscriber unit determines its own call rate. The portable subscriber unit comprises a receiver for receiving from a fixed portion of the radio communication system a threshold value based on communication activity associated with the portable subscriber unit, a processor coupled to the receiver for receiving information including the threshold value, a memory coupled to the processor for storing software and operating variables utilized by the processor, including the threshold value, the portable subscriber unit's own call rate and a transmitter coupled to the processor for transmitting a zone registration request to the fixed portion of the radio communication system. The processor is programmed for controlling the transmitter by allowing the portable subscriber unit to make zone registrations with the fixed portion when the portable subscriber unit's own call rate is greater than the threshold value and deferring zone registration with the fixed portion when the portable subscriber unit's own call rate is less than or equal to the threshold value until the portable subscriber unit's own call rate exceeds the threshold value.

DESCRIPTION OF THE PREFERRED EMBODIMENT

According to the preferred embodiment of this invention, unnecessary system traffic associated with tracking of subscribers in a zoned communication system is controlled through a flow control system based on call rates for the system as well as for a portable subscriber unit (PSU). A fixed portion of the system determines and broadcasts a system-wide call rate R. The PSU determines it's own call rate r. The fixed system further determines and broadcasts a threshold value L based on the system-wide call rate and a given fixed portion's inbound traffic load. The PSU determines whether to register, defer registration, or to notify the fixed portion of powering-off or converting from two-way to one-way based on a comparison between the threshold value L and the PSU's own call rate r. In other words, the present invention provides for a method of efficiently controlling information flow to a limited inbound communication resource in a two-way communication system in the situation where a PSU either detects a zone boundary change, a powering-off of the PSU, or where the PSU changes mode from a two-way device to a one way device. These events typically trigger inbound traffic that may be superfluous. The present invention accounts for these events in efficiently controlling in-bound traffic.

Figure 1:
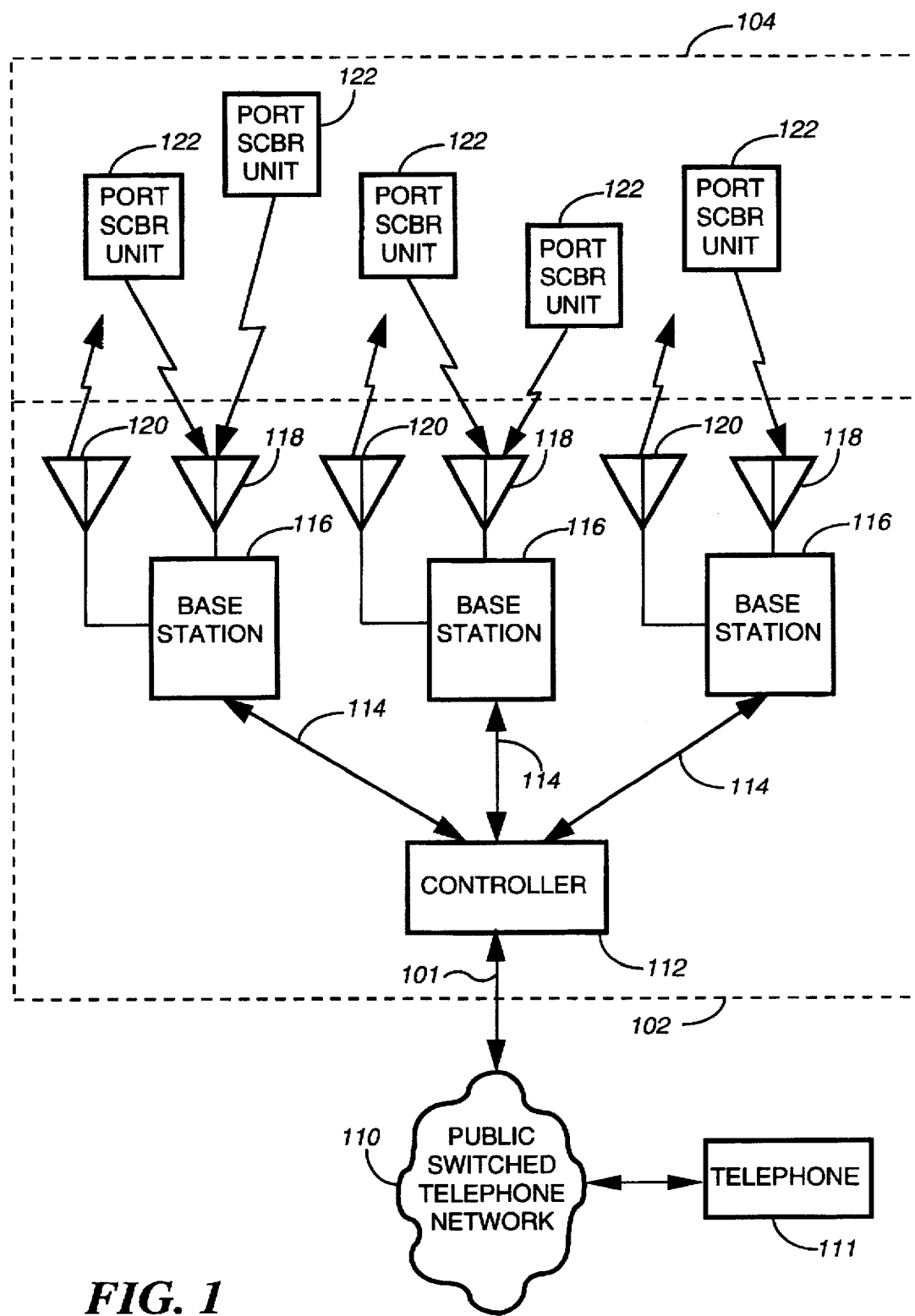
FIG. 1 is an electrical block diagram of a communication system in accordance with the present invention.

Referring to FIG. 1, an electrical block diagram of a communication system in accordance with the preferred embodiment of the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! paging control center manufactured by Motorola, Inc. of Schaumburg, Ill. The hardware of the base stations 116 is preferably similar to the Nucleus™ Orchestra! manufactured by Motorola, Inc. of Schaumburg, Ill. Other similar hardware can be utilized as well for the controller 112 and base stations 116. The controller 112 comprises a plurality of firmware elements in accordance with the preferred embodiment of the present invention, as will be described further below.

Each of the base stations 116 transmits radio signals to the portable portion 104 comprising a plurality of portable subscriber units 122 via a transmitting antenna 120. The base stations 116 each receive radio signals from the plurality of portable subscriber units 122 via a receiving antenna 118. The radio signals comprise selective call addresses and messages transmitted to the portable subscriber units 122 and acknowledgments received from the portable subscriber units 122. It will be appreciated that the portable subscriber units 122 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art.

Data and control transmissions between the base stations 116 and the portable subscriber units 122 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
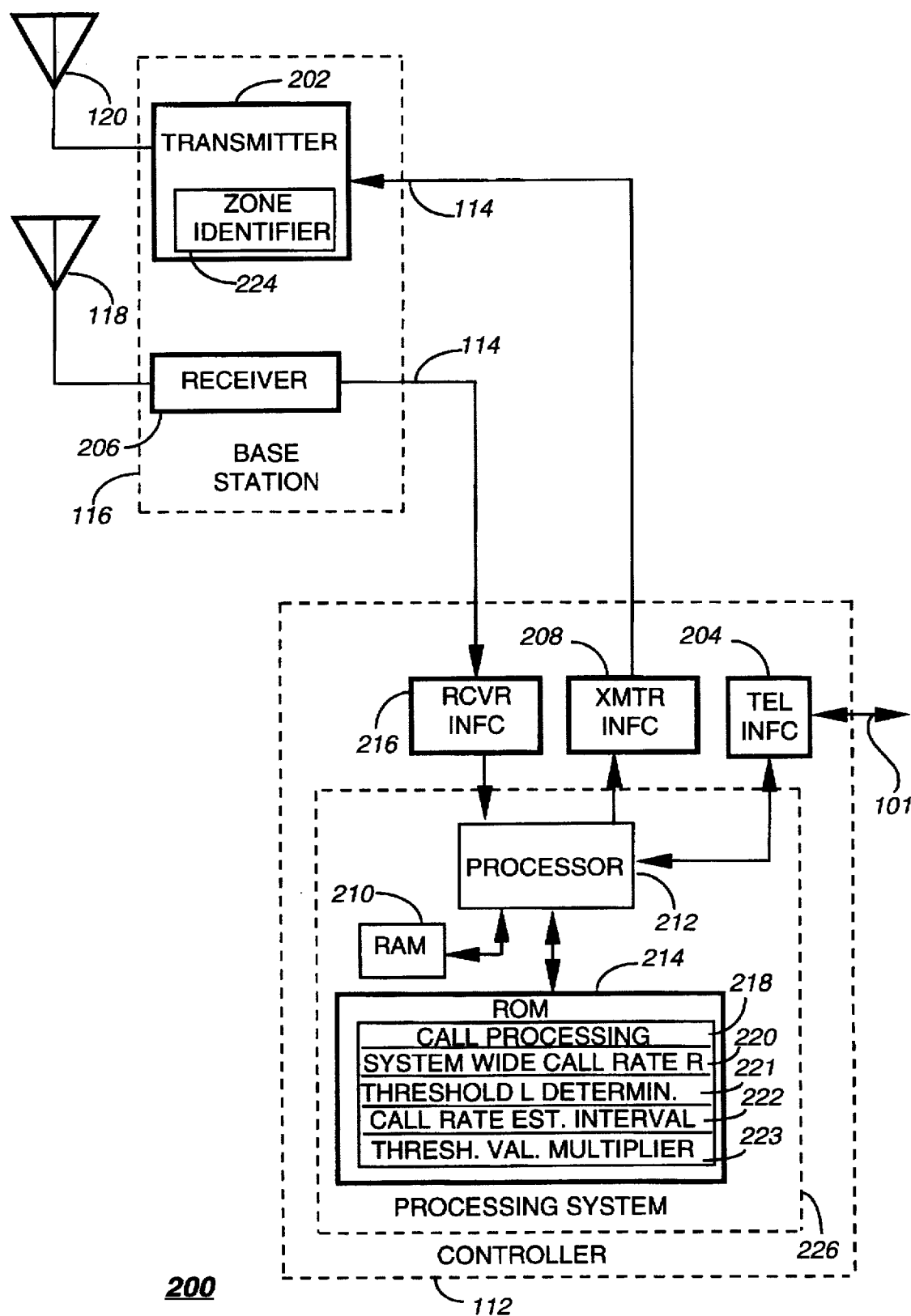
FIG. 2 is an electrical block diagram of portions of a controller and base station in accordance with the present invention.

Referring to FIG. 2, an electrical block diagram 200 of portions of the controller 112 and base station 116 in accordance with the preferred embodiment of the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122. Also preferably, the transmitter 202 comprises a zone identifier 224 stored within a non-volatile memory thereof for identifying a coverage zone in which the transmitter operates. The zone identifier 224 is preferably a non-zero value unique to the zone in which the transmitter 202 is located. In accordance with the present invention, the controller 112 also preferably instructs the transmitter 202 to broadcast a system-wide call rate R (220), a threshold value L (221), a call rate estimation interval (222), and a threshold value multiplier (223) as will be further described below.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. Additionally, a number of remote acknowledgment receivers 206 could be used and coupled to the receiver interface 216. The acknowledgment receiver 206 is for receiving one or more acknowledgments from the plurality of portable subscriber units 122. In addition, the processor 212 is coupled through a telephone interface 204 to the telephone links 101 and thence to the PSTN 110 for receiving message originations therefrom.

The processor 212 is coupled to a random access memory (RAM) 210 for storing messages to be transmitted to the portable subscriber units 122, and for storing messages received from the portable subscriber units 122. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processor system 226, and that additional processor systems of the same or alternative type can be added as required to handle the processing requirements of the controller 112.

The firmware elements of the controller 112 comprise a call processing element 218 for processing calls in a manner well known in the art. The firmware elements further comprise a system-wide call rate "R" determination element 220, a threshold "L" determination element 221, a call rate estimation interval determination element 222, and a threshold value multiplier determination element 223 in accordance with the preferred embodiment of the present invention. The threshold "L" determination element 221 uses the system wide call rate "R" (which is periodically determined using element 220) and the inbound traffic load to the base receiver(s) 206 to determine an appropriate threshold value "L". When the value "L" is broadcast, this intuitively serves as an indication to the PSUs of the size of the "gate" opening for zone registration.

Figure 3:
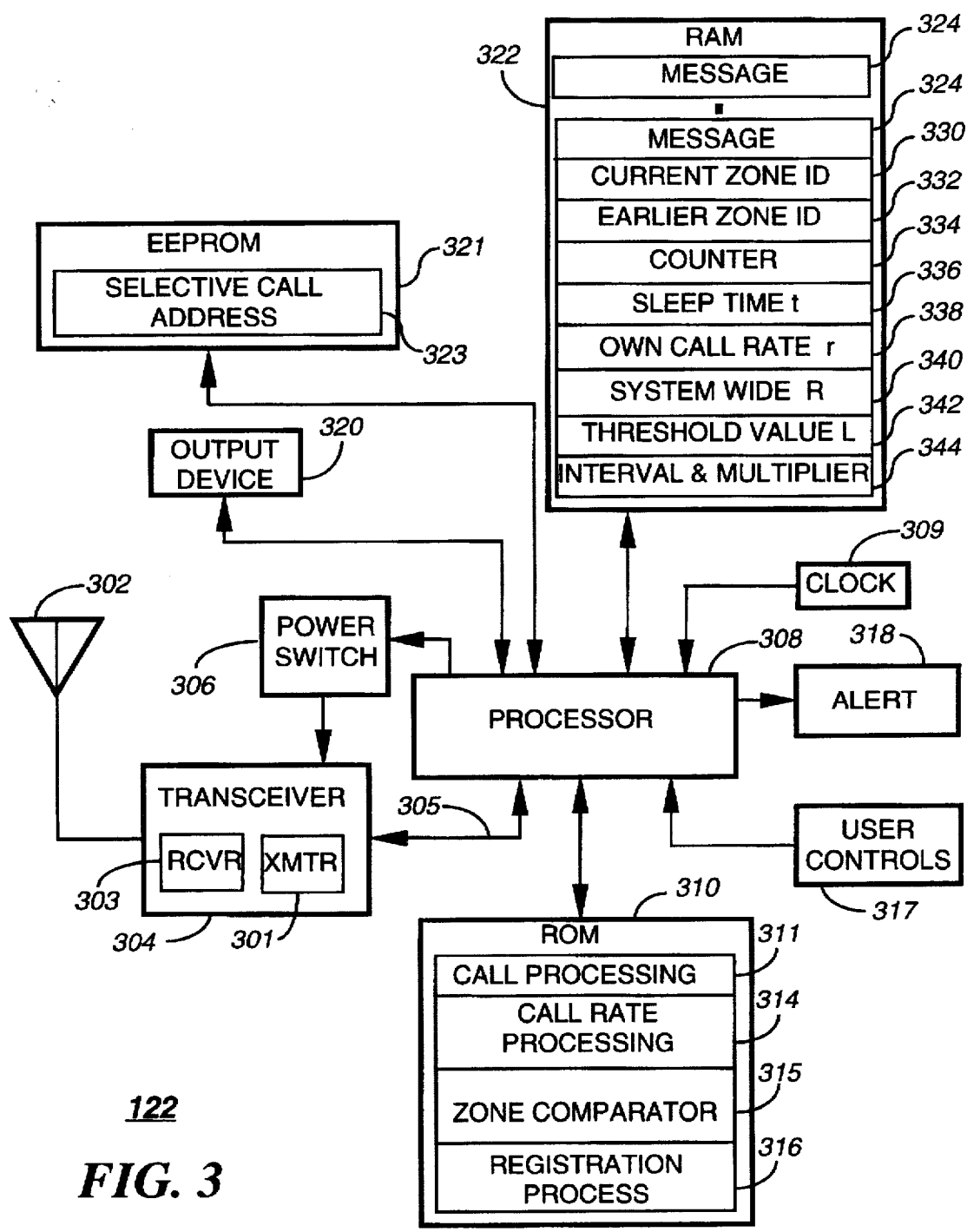
FIG. 3 is an electrical block diagram of a portable subscriber unit in accordance with the present invention.

Referring to FIG. 3, an electrical block diagram depicts the portable subscriber unit 122 in accordance with the preferred embodiment of the present invention. The portable subscriber unit 122 comprises a transceiver antenna 302 for transmitting and intercepting radio signals to and from the base stations 116. The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using four-level FSK operating at a bit rate of ninety-six-hundred bps. It will be appreciated that, alternatively, other bit rates and other types of modulation can be used as well.

A conventional power switch 306, coupled to the processor 308, is used to control the supply of power to the transceiver 304, thereby providing a battery saving function. A clock 309 is coupled to the processor 308 to provide a timing signal used to time various events as required in accordance with the present invention. The processor 308 also is coupled to a electrically erasable programmable read only memory (EEPROM) 321 which comprises at least one selective call address 323 assigned to the portable subscriber unit 122 and used to implement the selective call feature. The processor 308 also is coupled to a random access memory (RAM) 322 for storing the following: a message in a plurality of message storage locations 324, the current zone identifier 330 corresponding to the last zone identifier 224 received, the earlier zone identifier 332 corresponding to a previously received zone identifier 224, the a general purpose counter 334 to preferably count calls (to and from the PSU), a sleep time counter t (336), the PSU's own call rate "r" (338), the system-wide call rate "R" (340), the threshold value "L" (342), and optionally the call estimation interval value and threshold multiplier (344). The current zone identifier 330, the earlier zone identifier 332, and the other memory locations (334–344) will be further described below.

The processor 308 also is coupled to a read-only memory (ROM) 310 comprising firmware elements for use by the processor 308. The firmware elements comprise a call processing element 311 for handling of incoming messages on the outbound channel using techniques well known in the art. The call processing element 311 further comprises routines to determine the current zone that the portable subscriber unit 122 is located in and procedures for updating the current zone identifier 330. When the current zone identifier 330 is updated, the processor 308 executes instruction in a firmware element, zone comparator 315 and compares the current zone identifier 330 with the earlier zone identifier 332, to determine if a zone boundary has been crossed. When the current zone identifier 330 does not equal the earlier zone identifier 332, a boundary has been crossed and the value of the earlier zone identifier 332 is replaced with the value of the current zone identifier 330, in preparation for the next comparison. In addition, the firmware elements, call rate processing 314, and registration process 316 are executed as described below.

When an address is received by the processor 308, the call processing element 311 compares the received address with the at least one selective call address 323, and when a match is detected, a call alerting signal is generated to alert a user that a message has been received. The call alerting signal is directed to a conventional audible or tactile alert device 318 coupled to the processor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, locking, and deleting a message. For retrieving or reading a message, an output device 320, e.g., a conventional liquid crystal display (LCD), preferably also is coupled to the processor 308. It will be appreciated that other types of memory, e.g., EEPROM, can be utilized as well for the ROM 310 or RAM 322 and that other types of output devices, e.g., a speaker, can be utilized in place of or in addition to the LCD, particularly in the case of receipt of digitized voice.

The processor 308 preferably is implemented utilizing a microcomputer similar to the MC68HC11 series microcomputer, manufactured by Motorola, Inc. of Schaumburg, Ill. or other functionally equivalent Digital Signal Processor available from Motorola or AT&T. It will be appreciated that other similar microcomputers can be used as well for the processor 308, and that the ROM 310, the RAM 322, and/or the EEPROM 321 also can be included as a portion of the processor 308.

Figure 4:
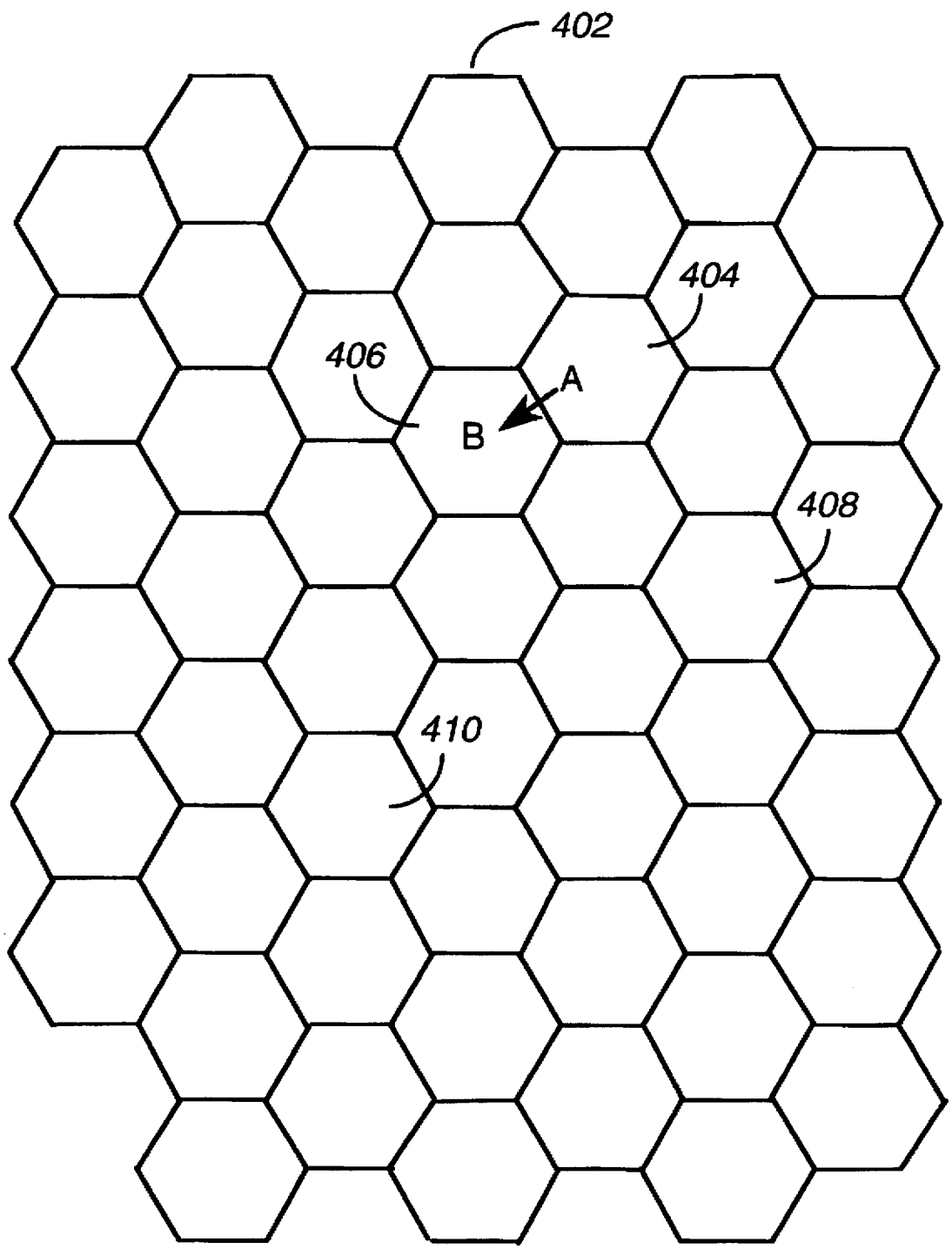
FIG. 4 depicts a coverage area partitioned into coverage zones in accordance with the present invention.

FIG. 4 depicts a coverage area partitioned into zones in accordance with the preferred embodiment of the present invention. Communication systems are often divided into regions or zones. Such zoned communication systems allows for frequency reuse. The concept of frequency reuse can be appreciated by studying coverage area 400. The coverage area 400 is divided into a number of hexagonal shaped zones. Located near the geometric center of radio coverage of each typical hexagonal zone 402, is the base station 116 along with the associated transmitting antenna 120 and receiving antenna 118 (not shown in FIG. 4). The power level and antenna gain is set such that the area of coverage of a given base station is essentially limited to a area slightly larger than the intended typical hexagonal zone 402. It will be appreciated that a number of conditions, beyond the control of the communications system designer, will cause the zones to be somewhat irregularly shaped. It can be seen that if the area of coverage is limited as described above, a portable subscriber unit 122 located in zone 410, for example, can be communicating with the base station 116 located in zone 410 at the same time and on the same frequency as a second portable subscriber unit 122 located in zone 408, for example, is communicating with a second base station 116 located in zone 408.

Before the fixed portion 102 can originate communication with a portable subscriber unit 122 in the zoned communication system, the fixed portion 102 must know the zone in which the portable subscriber unit 122 is located. In the preferred embodiment according to the present invention the fixed portion 102 relies on the portable subscriber unit 122 to register when the portable subscriber unit 122 crosses a zone boundary, as is the case when the portable subscriber unit 122 moves from point A located in zone 404 to point B in zone 406. Crossing a zone boundary is also called a zonal movement. When the fixed portion 102 has a message to deliver to a portable subscriber unit 122 but has not recorded the location of the portable subscriber unit 122 through a registration thereof, the fixed portion 102 proceeds with a series of broadcasts requesting the portable subscriber unit 122 to respond. By observing which base station 116 receives the response the fixed portion 102 can determine the location of the portable subscriber unit 122. A zone crossing registration request from a subscriber unit 122 that does not receive a message before the next zone boundary crossing generates useless registration traffic. Also, an unregistered high traffic portable subscriber unit 122 can cause the fixed portion 102 to process a considerable volume of traffic in an attempt to locate the portable subscriber unit 122. In the preferred embodiment of the present invention the registrations from the low traffic portable subscriber unit 122 are limited, while the high traffic users are allowed to register more freely, of course, also accounting for a particular system's system-wide call rate and inbound traffic load. The manner in which the registrations are controlled is described below.

In accordance with the present invention, a PSU estimates its own call rate r and subsequently follows simple decision rules for zone registration when the PSU crosses a zone boundary. The rules are summarized below:

No registration if Threshold Value L=a maximum threshold value $L_{max}$
Always register if L=0
Otherwise
  Register if normalized r>L
  Defer registration if normalized r≤L As an example, the threshold value L is preferably set to range as an integer value between 0 and a maximum threshold value $L_{max}$, where $L_{max}$ and L can be assumed to be 7 and 3 respectively in this example. The fixed portion 102 dictates (based on system requirements) the call rate estimation interval (in hours) and the multiplier for use in normalizing the PSU's own call rate r. Thus, if the call rate estimation interval is set to 24 hours and a PSU only receives 8 messages within those 24 hours, the PSU's own call rate is 1call/3hours. To significantly compare the PSU's own call rate r to the threshold value L, r is multiplied by the multiplier value (assumed here to equal 6 in this example) to obtain the normalized value 2. Then, the rules described above & with respect to FIGS. 6–8 are followed in determining whether the PSU needs to register with the fixed portion. In this instance, the normalized r value is greater than or equal to the threshold value L, so the PSU registers with the fixed portion.

Figure 6:
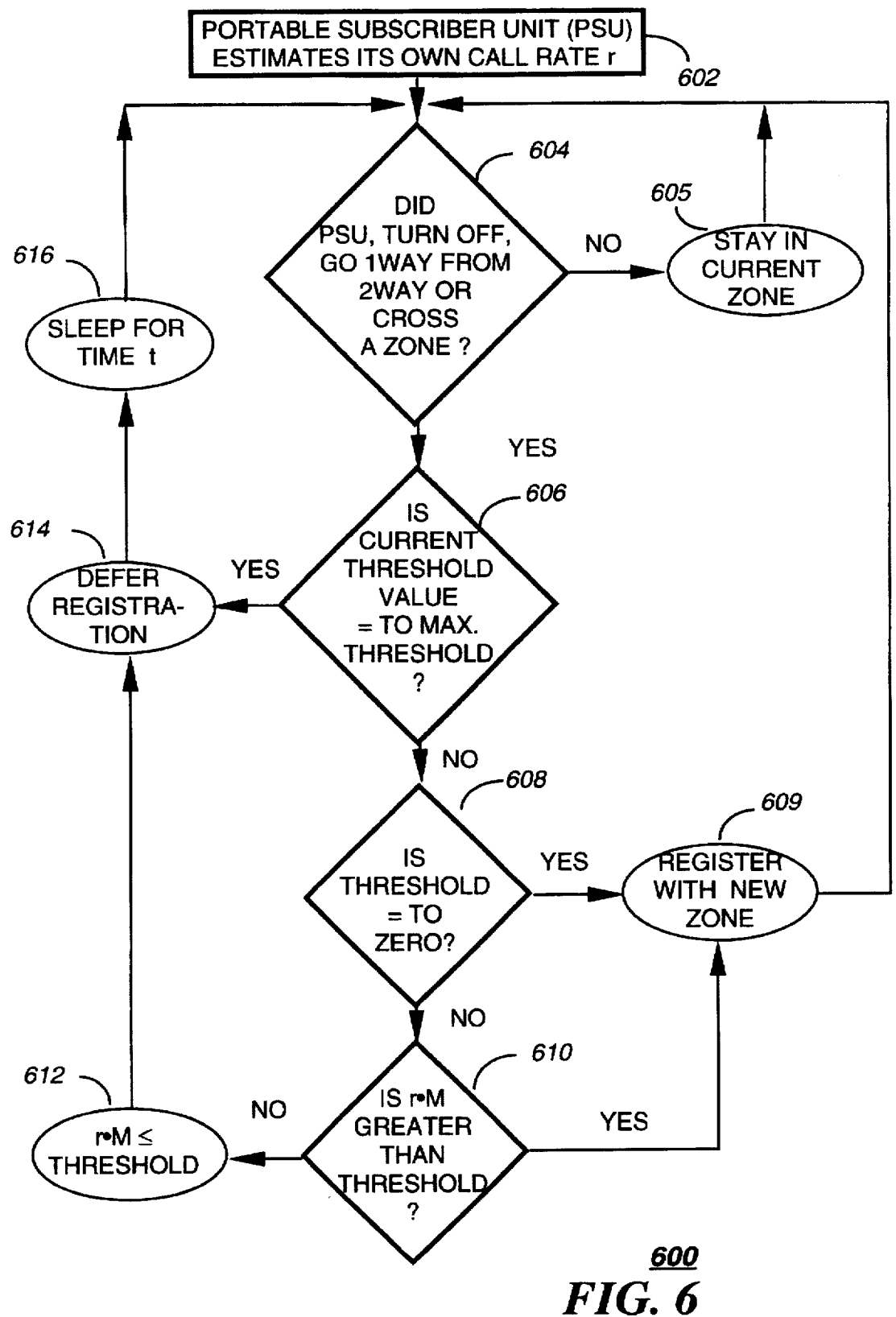
FIG. 6 is a flow chart depicting operation of the portable subscriber unit while crossing a zone border, turning off, or going from a two-way device to a one-way device in accordance with the present invention.
Figure 7:
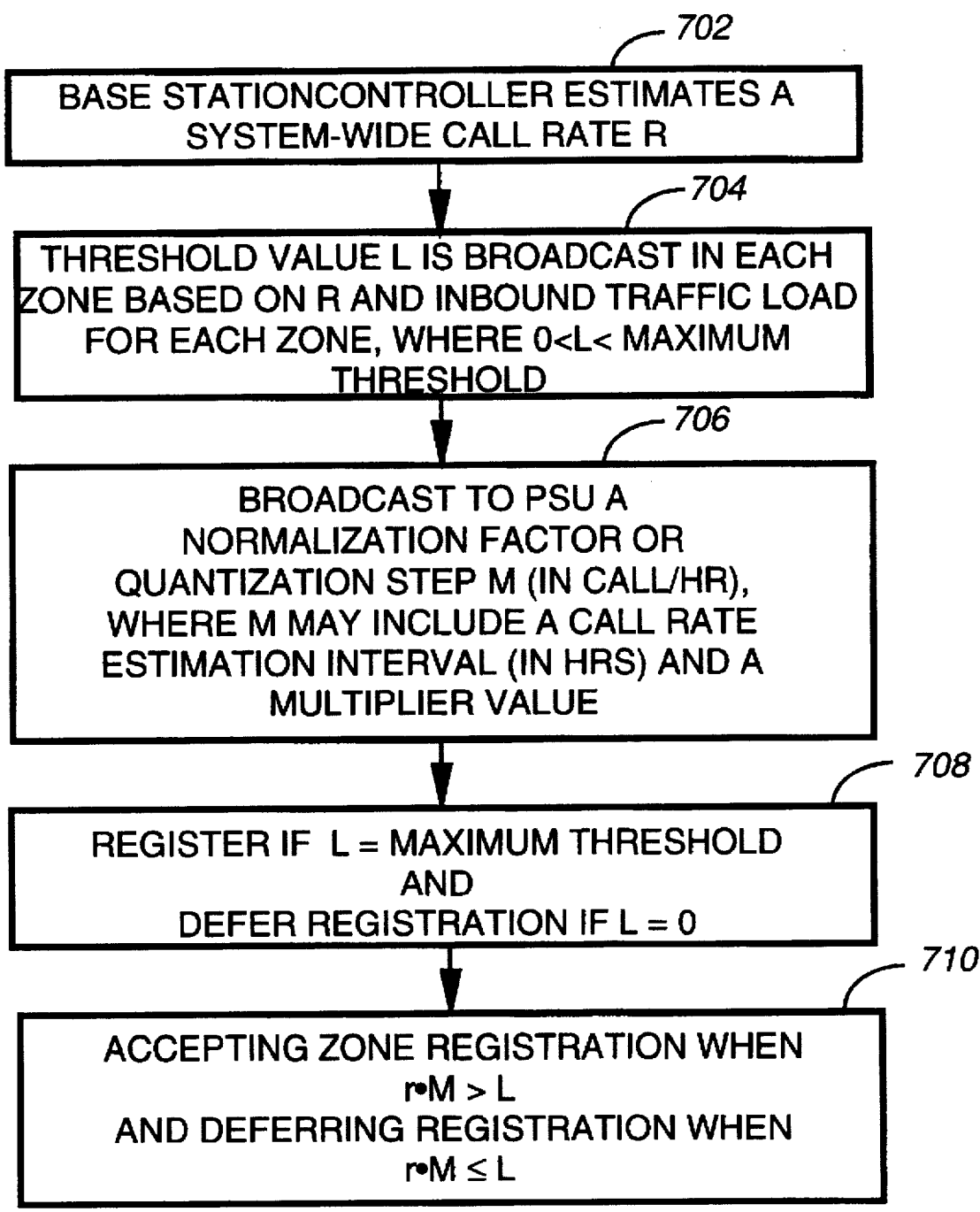
FIG. 7 is a flow chart depicting operation of the fixed portion while calculating and transmitting the threshold value in accordance with the present invention.
Figure 8:
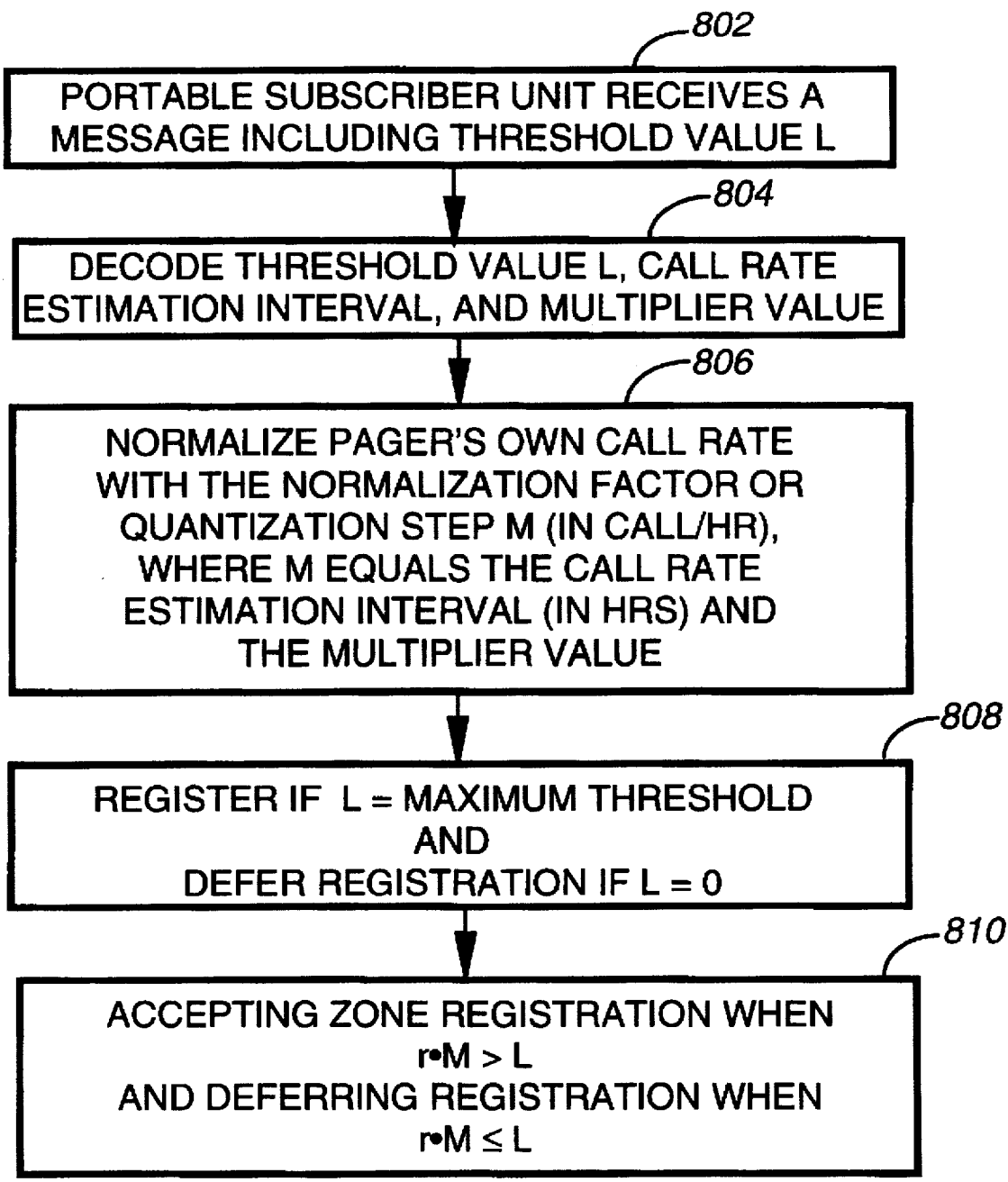
FIG. 8 is a flow chart depicting operation of the portable subscriber unit while decoding the threshold value for use in determining zone registration in accordance with the present invention.

In another example if the call rate estimation interval is set to 3 hours and a PSU receives 12 messages within those 3 hours, the PSU's own call rate is 4calls/hour. To significantly compare the PSU's own call rate r to the threshold value L, r is multiplied by the multiplier value (assumed here to equal 1 in this example) to obtain the normalized value 4. Then, the rules described with respect to FIGS. 6–8 are followed in determining whether the PSU needs to register with the fixed portion. In this instance, the normalized r value is less than the threshold value L, so the PSU defers registration with the fixed portion.

In each instance, the system provides the PSUs with a multiplier and a call rate estimation interval which serves as a quantization step or normalization step which the fixed portion and PSUs will both know. The normalization step can be predetermined, broadcast over-the-air, or made over-the-air programmable. The normalization step allows the system to a great extent to control and optimize the flow control system based on the available resources and historical message flow patterns.

Figure 5:
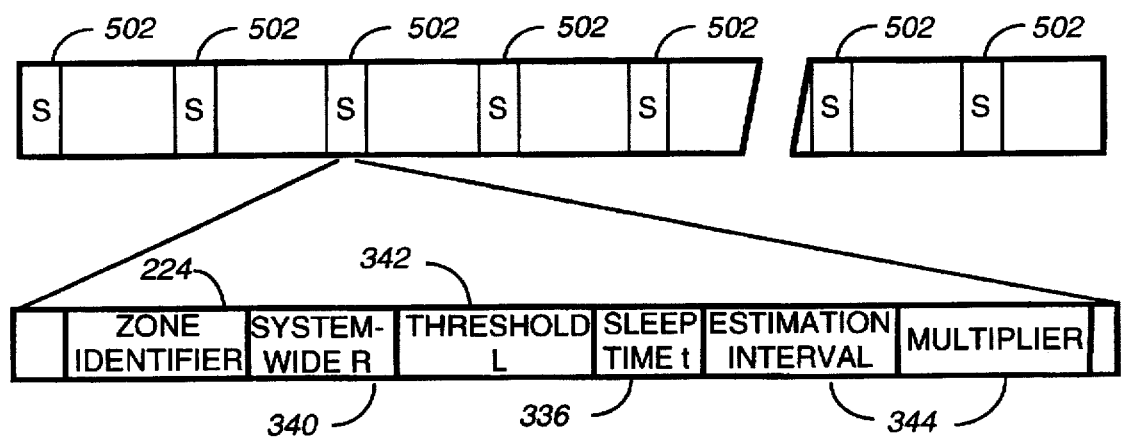
FIG. 5 is a timing diagram depicting events that occur during a transmission from the fixed portion in accordance with the present invention.

FIG. 5 is a timing diagram 500 depicting events that occur during a transmission from the base station 116 to the portable subscriber unit 122, located within in the same zone as the base station 116, in accordance with the preferred embodiment of the present invention. As stated above the base station 116 broadcasts a message containing the zone identifier 224 that identifies the zone associated with the base station 116, the system-wide call rate R (340), indicating the overall call rate for the system, the threshold value L (342), indicating how wide the "gate" of the zone shall be opened based on R and the current zone inbound traffic load, the Sleep Time t (336), indicating a retry period and the quantization or normalization steps including the call rate estimation interval and the multiplier (344). The timing diagram 500 shows the message being transmitted by the base station 116 having a series of synchronization blocks 502 with the zone identifier 224, the system wide call rate R, the threshold value L, the sleep time t, the call rate estimation interval and the multiplier all imbedded. It will be appreciated that, alternatively, other message formats can be used as well.

FIG. 6 is a flow chart depicting operation of the portable subscriber unit 122 while crossing a zone border (or turning off or going from a two-way device to a one-way only device (conventional pager)) in accordance with the present invention and the decision rules explained above. The process starts with step 602 where the PSU 122 estimates its own call rate r. Then, at decision block 604, the PSU 122 queries whether a zone boundary is crossed (or the PSU is turned off or changed to a received only (one-way) device. If the PSU did not cross a zone boundary (or turn off or go to one-way mode), then the PSU stays in the current zone as shown in step 605. If the PSU crossed a zone boundary, decision block 606 checks whether the current threshold value L is equal to the maximum threshold value $L_{max}$. If true, registration is deferred at step 614 and the PSU goes to sleep for time t at step 616. If not, then the PSU checks whether the threshold value L is equal to zero at decision block 608. If true, then the PSU registers with the new zone at step 609. If not, the PSU queries whether the normalized value of the PSU's own call rate (r·M) is greater than the threshold value L (where M is used as a multiplier as a normalization factor or quantization step). If true, then the PSU registers with the new zone at step 609, otherwise the normalized value of the PSU's own call rate is less than or equal to the threshold value (step 612) and registration is deferred at step 614.

FIG. 7 is a flow chart depicting operation of the fixed portion 102 while dynamically determining and transmitting the threshold value L in accordance with the present invention. The process starts with step 702 with the controller 112 estimating a system-wide call rate R and optionally extracting a measure of system traffic (e.g., a percentage of total system capacity) and other related parameters from processes being performed when the controller 112 is executing the call processing element 218. The other related parameters comprise, for example, the time of day and the day of the week, and the inbound traffic load for each zone. The controller 112 analyzes the system-wide call rate and inbound traffic load, and optionally the measure of system traffic and other related parameters (e.g., the system traffic exceeds fifty percent of the total system capacity) to determine whether to allow more registrations by lowering the threshold value. On the other hand, depending on the traffic and other related parameters, in step 702 the controller 112 can restrict registration by increasing the threshold value L. Thus, at step 704, the threshold value L is broadcast in each zone, where L is a value between 0 and a maximum threshold value $L_{max}$. At step 706, a normalization factor or quantization step M (in calls/hr.) is broadcast to the portable portion 104. The quantization step M may include a call rate estimation interval (in hours) and a separate multiplier value. It will also be appreciated that in some systems one or more of the parameters may remain fixed. It will be further appreciated that alternatively other methods can be used to determine the value of these parameters. Next, at steps 708 and 710, the controller 112 awaits the results from the PSU when the PSU follows the decision rules previously described. Thus, at step 708, if $L=L_{max}$, then the PSU should register; if L=0, registration should be deferred and the PSU does not even need to add further traffic on the inbound channel to request registration. At step 710, if r·M>L, then controller 112 should accept registration from the PSU; if r·M≦L, then registration is also deferred and the PSU, as before, does not need to add further traffic on the inbound channel to request registration.

FIG. 8 is a flow chart depicting operation of PSU 122 while crossing a zone boundary in accordance with the present invention. When a message is received in step 802, the processor 308 in step 804 decodes the threshold value L that was previously broadcast by the base station 116. Additionally, the processor in 308 retrieves the call rate estimation interval and multiplier values that may have been sent with the message in step 802 or previously sent and stored in the PSU 122. Next in step 806 the processor 308 normalizes (if necessary) the PSU's own call rate with the call rate estimation value and the multiplier value from step 804. Next, at steps 808 and 810, the PSU follows the decision rules previously described. Thus, at step 808, if $L=L_{max}$, then the PSU should register with the fixed portion; if L=0, registration should be deferred and the PSU does not bother creating any further traffic on the inbound channel to request registration. At step 810, if r·M>L, the PSU should register with the fixed portion; if r·M≦L, then registration is also deferred and the PSU, as before, does not need to add further traffic on the inbound channel to request registration.

As can be seen from the above description, the present invention will advantageously control unnecessary system traffic associated with tracking of subscribers in a zoned communication system, through the flow control system based on call rates at the PSU and fixed portions. Controlling registrations and system wide searches in this fashion, will increase system capacity, reduce message delivery delays, enhance user satisfaction and contribute to the commercial success of the system.

What is claimed is:

1. A method of controlling zone registrations in a radio communication system providing radio coverage to a wireless portable subscriber unit (PSU) within a plurality of zones where the PSU determines its own call rate, the method comprising in a fixed portion of the radio communication system the steps of:

transmitting to the PSU a threshold value based on communication activity associated with the PSU, wherein the threshold value is between 0 and a maximum threshold value; and accepting zone registrations from the PSU when the PSU's own call rate is greater than the threshold value and deferring zone registration from the PSU when the PSU's own call rate is less than or equal to the threshold value until the PSU's own call rate exceeds the threshold value.

2. The method of claim 1, wherein the communication activity associated with the PSU is based on a system wide call rate and a given zone's inbound traffic load.

3. The method of claim 1, wherein method further comprises the step of sending to the PSU a call rate estimation interval value.

4. The method of claim 1, wherein method further comprises the step of sending to the PSU a multiplier value to normalize the PSU's own call rate with the threshold value.

5. The method of claim 1, wherein the method further comprises the step of always accepting zone registrations when the threshold value is equal to 0.

6. The method of claim 1, wherein the method further comprises the step of always deferring zone registrations when the threshold value is equal to the maximum threshold value.

7. A method for efficiently controlling information flow to a limited inbound communication resource in a two-way radio communication system providing coverage to a plurality of portable subscriber units within a plurality of zones, wherein each of the portable subscriber units determine their own call rate, the method comprising the steps of:

determining a threshold value based on a system-wide call rate and a traffic measure of the limited inbound communication resource;

broadcasting the threshold value to at least one of the plurality of portable subscriber units; and transmission of registration information by the at least one of the plurality of portable subscriber units to the limited inbound communication resource when the portable subscriber unit's own call rate is greater than the threshold value and deferring transmission of registration information when the portable subscriber unit's own call rate is less than or equal to the threshold value until the portable subscriber unit's own call rate exceeds the threshold value.

8. The method of claim 7, wherein the method further comprises the step of always accepting zone registrations when the threshold value is equal to 0.

9. The method of claim 7, wherein the method further comprises the step of always deferring zone registrations when the threshold value is equal to a maximum threshold value.

10. The method of claim 7, wherein the transmission of registration information is in response to a step of detecting a zone boundary change by the at least one of the plurality of portable subscriber units, wherein the registration information is a registration request.

11. The method of claim 7, wherein the transmission of registration information is in response to a step of detecting a powering-off by the at least one of the plurality of portable subscriber units, wherein the registration information is a de-registration request.

12. The method of claim 7, wherein the transmission of registration information is in response to a step of detecting a change of mode by the at least one of the plurality of portable subscriber units from a two-way device to a one-way device, wherein the registration information is a notification to the limited inbound communication resource of one-way capability.

13. A method of controlling zone registrations in a radio communication system providing radio coverage to a wireless portable subscriber unit (PSU) within a plurality of zones wherein the PSU determines its own call rate, the method comprising in a fixed portion of the radio communication system the steps of:

sending to the PSU a threshold value based on communication activity associated with the PSU, wherein the communication activity associated with the PSU is based on a system wide call rate and a given zone's inbound traffic load and the threshold value is between 0 and a maximum threshold value;

sending to the PSU a call rate estimation interval value;

sending to the PSU a multiplier value to normalize the PSU's own call rate with the threshold value; and accepting zone registrations from the PSU when the PSU's own call rate is greater than the threshold value and deferring zone registration from the PSU when the PSU's own call rate is less than or equal to the threshold value until the PSU's own call rate exceeds the threshold value.

14. The method of claim 13, wherein the method further comprises the step of always accepting zone registrations when the threshold value is equal to 0.

15. The method of claim 13, wherein the method further comprises the step of always deferring zone registrations when the threshold value is equal to the maximum threshold value.

16. A method of controlling zone registrations in a radio communication system providing radio coverage to a wireless portable subscriber unit (PSU) within a plurality of zones wherein the PSU determines its own call rate, the method comprising in the PSU the steps of:

receiving from a fixed portion of the radio communication system a threshold value based on communication activity associated with the PSU, wherein the threshold value is between 0 and a maximum threshold value; and registering with the fixed portion when the PSU's own call rate is greater than the threshold value and deferring zone registration with the fixed portion when the PSU's own call rate is less than or equal to the threshold value until the PSU's own call rate exceeds the threshold value.

17. The method of claim 16, wherein the communication activity associated with the PSU is based on a system wide call rate and a given zone's inbound traffic load.

18. The method of claim 16, wherein method further comprises the step at the PSU of receiving from fixed portion a call rate estimation interval value.

19. The method of claim 16, wherein method further comprises the step of receiving at the PSU from the fixed portion a multiplier value to normalize the PSU's own call rate with the threshold value.

20. A controller for controlling zone registrations in a radio communication system providing radio coverage to a wireless portable subscriber unit (PSU) within a plurality of zones, the controller comprising:

a processing system for controlling operation of the controller;

a transmitter interface coupled to the processing system for sending information including a message to the portable subscriber unit;

a receiver interface coupled to the processing system for receiving information including a zone registration request from the portable subscriber unit, wherein the processing system is programmed for:

sending to the PSU a threshold value based on communication activity associated with the PSU, wherein the communication activity associated with the PSU is based on a system wide call rate and a given zone's inbound traffic load and the threshold value is between 0 and a maximum threshold value;

sending to the PSU a call rate estimation interval value;

sending to the PSU a multiplier value to normalize the PSU's own call rate with the threshold value; and accepting zone registrations from the PSU when the PSU's own call rate is greater than the threshold value and deferring zone registration from the PSU when the PSU's own call rate is less than or equal to the threshold value until the PSU's own call rate exceeds the threshold value.

21. The controller of claim 20, wherein the processing system is further programmed to always accept zone registrations when the threshold value is equal to 0.

22. The controller of claim 20, wherein the processing system is further programmed to defer zone registrations when the threshold value is equal to the maximum threshold value.

23. A portable subscriber unit (PSU) using controlled zone registrations in a radio communication system providing radio coverage to the PSU within a plurality of zones wherein the PSU determines its own call rate, the PSU comprising:

a receiver for receiving from a fixed portion of the radio communication system a threshold value based on communication activity associated with the PSU, wherein the threshold value is between 0 and a maximum threshold value;

a processor coupled to the receiver for receiving information including the threshold value;

a memory coupled to the processor for storing software and operating variables utilized by the processor, including the threshold value, the maximum threshold value and the PSU's own call rate; and a transmitter coupled to the processor for transmitting a zone registration request to the fixed portion of the radio communication system and wherein the processor is programmed for controlling the transmitter by allowing the PSU to make zone registrations with the fixed portion when the PSU's own call rate is greater than the threshold value and deferring zone registration with the fixed portion when the PSU's own call rate is less than or equal to the threshold value until the PSU's own call rate exceeds the threshold value.

24. The PSU of claim 23, wherein the communication activity associated with the PSU is based on a system wide call rate and a given zone's inbound traffic load.

25. The PSU of claim 23, wherein the PSU of receives from the fixed portion a call rate estimation interval value.

26. The PSU of claim 23, wherein the PSU receives from the fixed portion a multiplier value to normalize the PSU's own call rate with the threshold value.

27. The PSU of claim 23, wherein the processor is further programmed to always request zone registrations when the threshold value is equal to 0.

28. The PSU of claim 23, wherein the processor is further programmed to defer zone registrations when the threshold value is equal to the maximum threshold value.

* * * * *